US011230006B2

(12) United States Patent
Lager et al.

(10) Patent No.: US 11,230,006 B2
(45) Date of Patent: Jan. 25, 2022

(54) INDUSTRIAL OBJECT HANDLING ROBOT

(71) Applicant: ABB Schweiz AG, Baden (CH)

(72) Inventors: Anders Lager, Västerås (SE); Raoul Audibert, Västerås (SE)

(73) Assignee: ABB Schweiz AG, Baden (CH)

(*) Notice: Subject to any disclaimer, the term of this patent is extended or adjusted under 35 U.S.C. 154(b) by 322 days.

(21) Appl. No.: 16/302,950

(22) PCT Filed: May 20, 2016

(86) PCT No.: PCT/EP2016/061363
§ 371 (c)(1),
(2) Date: Nov. 19, 2018

(87) PCT Pub. No.: WO2017/198306
PCT Pub. Date: Nov. 23, 2017

(65) Prior Publication Data
US 2019/0143520 A1 May 16, 2019

(51) Int. Cl.
*B25J 9/16* (2006.01)
*G05B 19/418* (2006.01)

(52) U.S. Cl.
CPC ........ *B25J 9/1669* (2013.01); *G05B 19/4182* (2013.01); *G05B 2219/39102* (2013.01);
(Continued)

(58) Field of Classification Search
CPC ............... B25J 9/1669; G05B 19/4182; G05B 2219/39102; G05B 2219/40007; G05B 2219/45063; Y02P 90/02
(Continued)

(56) References Cited

U.S. PATENT DOCUMENTS 5,040,056 A * 8/1991 Sager .................... B25J 19/023
348/88
5,041,907 A * 8/1991 Sager .................... B25J 9/1697
348/91

(Continued)

FOREIGN PATENT DOCUMENTS

CN 101259585 A 9/2008
CN 102648442 A 8/2012
(Continued)

OTHER PUBLICATIONS

International Search Report and Written Opinion of the International Searching Authority Application No. PCT/EP2016/061363 Completed: Mar. 6, 2017; dated Mar. 16, 2017 13 pages.
(Continued)

*Primary Examiner* — Michael Collins
(74) *Attorney, Agent, or Firm* — Whitmyer IP Group LLC

(57) ABSTRACT

An arrangement for handling objects on an object transporting device includes an industrial robot and an object handling control device. The device estimates candidate handling positions (OP1, OP2, OP3, OP4, OP5, OP6, OP7) for at least one candidate object based on a first assumption; determines for each candidate handling position whether it lies within a working volume (wv1) of the robot; selects one of the candidate positions (OP1) at a first decision instant, the selection being at least partially based on the result of the determining; and handles an object at an actual handling position corresponding to the selected candidate handling position, the handling being performed after a usage time of the robot, the usage time including the time for moving the robot from the robot position at the first decision instant to the actual handling position, and the time for handling the object.

16 Claims, 4 Drawing Sheets

(52) U.S. Cl.
CPC .............. *G05B 2219/40007* (2013.01); *G05B 2219/45063* (2013.01); *Y02P 90/02* (2015.11)

(58) Field of Classification Search
USPC ................................................. 700/213–230
See application file for complete search history.

(56) References Cited

U.S. PATENT DOCUMENTS

| | | | |
|---|---|---|---|
| 8,565,912 | B2 | 10/2013 | Wappling et al. |
| 10,486,309 | B2* | 11/2019 | Ishikawa ................ B25J 9/1674 |
| 2011/0082586 | A1* | 4/2011 | Nishihara .............. B25J 9/1697 |
| | | | 700/259 |
| 2011/0224826 | A1* | 9/2011 | Maehara ................ B25J 9/1676 |
| | | | 700/255 |
| 2012/0059507 | A1* | 3/2012 | Ugarte Barrena ...... B65B 5/105 |
| | | | 700/214 |
| 2012/0083923 | A1* | 4/2012 | Matsumoto ............ G05D 1/024 |
| | | | 700/255 |
| 2012/0165972 | A1* | 6/2012 | Wappling ............... B25J 9/1687 |
| | | | 700/213 |
| 2015/0253774 | A1* | 9/2015 | Takaoka ................. G05D 1/024 |
| | | | 701/23 |
| 2021/0283782 | A1* | 9/2021 | Miao ..................... G06T 7/0004 |

FOREIGN PATENT DOCUMENTS

| | | |
|---|---|---|
| CN | 104062902 A | 9/2014 |
| CN | 104108579 A | 10/2014 |
| CN | 105173589 A | 12/2015 |
| CN | 105184019 A | 12/2015 |
| EP | 1748339 A2 | 1/2007 |
| JP | 2013000861 A | 1/2013 |
| WO | 2004018332 A1 | 3/2004 |

OTHER PUBLICATIONS

Chinese Office Action; Application No. 201680085897X; dated Apr. 2, 2021; 4 Pages.

* cited by examiner

INDUSTRIAL OBJECT HANDLING ROBOT

TECHNICAL FIELD

The present invention relates to the field of industrial robots. The invention more particularly relates to a method and robot arrangement for handling objects on an object transporting device.

BACKGROUND

Pick and place robots are frequently used in various production systems. Pick and place robots typically operate through the robot picking an object transported by a first object transporting device and placing the object in a suitable location, such as in a stationary location. It is also possible that an object is picked from a stationary location and placed on a second object transporting device. It is finally possible that an object is picked from a first object transporting device and placed on a second object transporting device.

In one type of system it is known to have a pick window and a place window, where such a window is typically a rectangular area covering a corresponding object transporting device and the location in the window at which the robot is able to handle an object, such as to pick or place an object. An object inside a window at the time that a picking or placing decision is made may then be considered to be possible to pick or place.

U.S. Pat. No. 5,040,056 describes another type of system where objects to be picked are placed in a queue based on the order in which they are transported on a conveyor belt. The first object in the queue is then investigated if it is to be picked based on if the object will leave a picking window or not in the time of moving the robot for picking the object.

U.S. Pat. No. 8,565,912 discloses a similar type of system as U.S. Pat. No. 5,040,056, where in addition the size of the working window gets reduced because of the operating range of the robot.

The reduction of the window has the advantage of ensuring that only objects possible to be picked are actually allowed to be picked. However the efficiency of the picking is at the same time reduced.

It would in view of what is disclosed above be of interest to improve the operation so that a more efficient object handling is achieved.

SUMMARY

The present invention is therefore directed towards allowing a more efficient object handling by an industrial robot.

This object is according to a first aspect of the present invention achieved through a method for handling objects on an object transporting device using an industrial robot, the method comprising the steps of:
estimating candidate handling positions for at least one candidate object based on a first assumption;
determining for each candidate handling position whether it lies within a working volume of the robot;
selecting one of the candidate positions at a first decision instant, the selection being at least partially based on the result of the determining; and
handling an object at an actual handling position corresponding to the selected candidate handling position, the handling being performed after a usage time of the robot, the usage time comprising the time for moving the robot from the robot position at the first decision instant to the actual handling position, and the time for handling the object.

This object is according to a second aspect of the present invention achieved through a robot arrangement for handling objects on an object transporting device and comprising an industrial robot and an object handling control device, the object handling control device being configured to estimate candidate handling positions for at least one candidate object based on a first assumption; determine for each candidate handling position whether it lies within a working volume of the robot; select one of the candidate positions at a first decision instant, the selection being at least partially based on the result of the determining; and handle an object at an actual handling position corresponding to the selected candidate handling position, the handling being performed after a usage time of the robot, the usage time comprising the time for moving the robot from the robot position at the first decision instant to the actual handling position, and the time for handling the object.

The first assumption may comprises at least one of the following: an assumed travel distance of the object transporting device during the usage time, and an assumed usage time.

The handling described above may comprise picking the object at the actual handling position or placing the object at the actual handling position.

The estimating of a candidate handling position may be based on an estimate of the transporting speed of the object transporting device during the usage time.

When the handling of an object comprises picking the object, the selected candidate position comprises the position of an object to be picked and the handling of the object is the gripping of it.

When the handling of an object comprises placing an object, the selected candidate position comprises a position at which an object is to be placed and the handling of the object is the releasing of it.

The present invention has many advantages. Since the working volume is considered in the selection of a candidate position a more efficient handling position selection may be obtained. The selection is also flexible in that several candidates may exist at any given time.

It should be emphasized that the term "comprises/comprising" when used in this specification is taken to specify the presence of stated features, integers, steps or components, but does not preclude the presence or addition of one or more other features, integers, steps, components or groups thereof.

BRIEF DESCRIPTION OF THE DRAWINGS

The present invention will now be described in more detail in relation to the enclosed drawings, in which.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail.

The invention is concerned with an industrial robot equipped with at least one robot arm.

Figure 1:
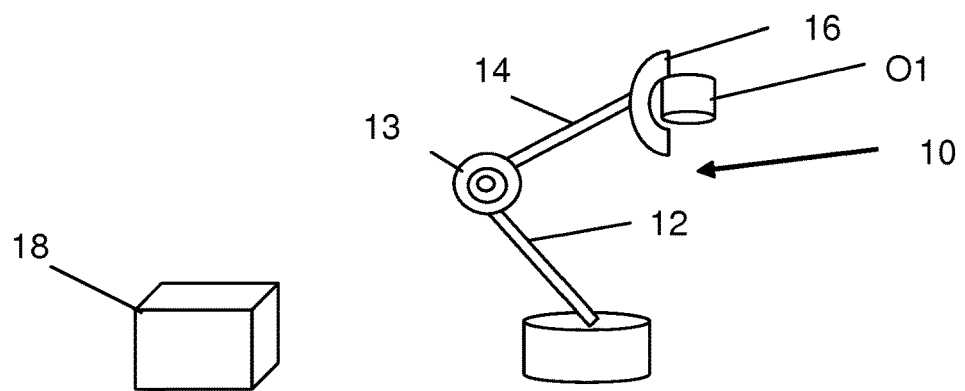
FIG. 1 schematically shows a robot arrangement comprising a first type of industrial robot and an object handling control device in the form of a robot controller, FIG. 2 schematically shows a second type of industrial robot that may be used in the robot arrangement.

FIG. 1 schematically shows a first type of industrial robot 10 and an object handling control device in the form of a robot controller 18. The robot 10 is an arm-robot, it thus comprises one arm formed through a number of arm sections 12 and 14 connected to each other via joints 13. The robot 10 shown in FIG. 1 is simplified and therefore only two arm sections are shown, a first and a second arm section 12 and 14, connected to each other via a joint 13. It should however be realized that an arm-robot normally comprises many more arm sections, typically six and consequently also several more joints.

The first arm section 12 is here connected to a foundation. In this way the robot 10 is attached to the foundation. The second arm section 14 normally comprises a tool holder for allowing a tool to be connected to the robot 10. In FIG. 1 one such tool 16 is shown as being attached to the second arm section 14. The tool 16 is used for picking objects and an exemplifying first object O1 is shown as being held by the tool 16. The robot in FIG. 1 is a stationary robot made to move within a working volume that is determined by the reach of the tool made possible by the various movements of the joints.

Figure 2:
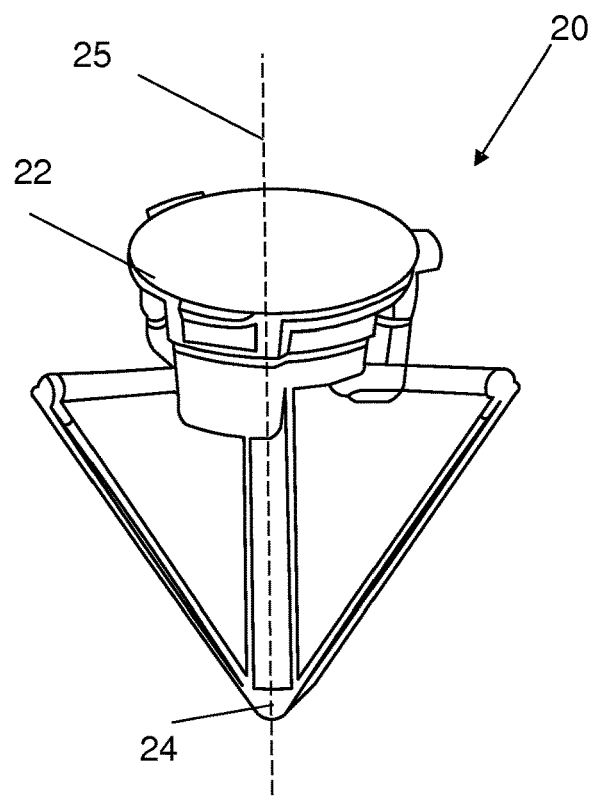

FIG. 2 shows an alternative industrial robot 20 in the form of a parallel-arm robot. This robot has a stationary body 22 joined to a gripper 24 with a number of parallel robot arms, such as three arms. There is also a vertical wrist axis 25 having a joint to the gripper 24 and around which the gripper 24 may rotate. This type of robot may be mounted in a ceiling and the gripper 24 may be set to move horizontally and vertically through combined movements of the parallel arms. The gripper 24 may grip objects at various positions based on said combined parallel arm movements. In this case the working volume of the robot may be defined as all the various positions that are possible for the gripper based on the movements of the parallel arms.

There is thus in both types of robots a working volume in which the robot may be able to grip objects. The working volume is thereby determined by the robot positions that the robot is able to occupy. The working volume may be the volume defined by these robot positions. However it may also be smaller than the volume defined by the movement. It may more particular have the same shape as the volume defined by the robot positions but with an added safety margin.

Figure 3:
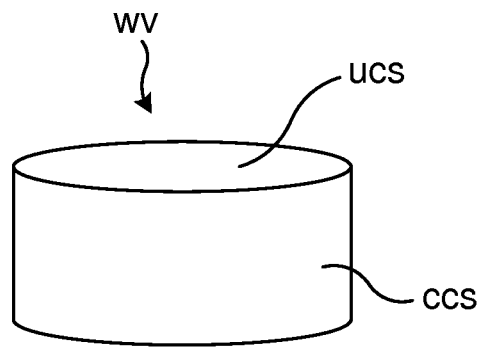
FIG. 3 shows a perspective view of an exemplifying working volume of a robot, FIG. 4 schematically shows a cross-section through a first working volume in which there is a first object transporting device transporting a number of objects past the robot, FIG. 5 schematically shows a cross-section through a second working volume with the first object transporting device together with a second object transporting device.

FIG. 3 shows one simplified example of a working volume wv. This working volume wv is an example of a working volume that can be used in both types of robots. The working volume wv is in this example in the form of a cylinder. The working volume wv can thereby be seen as defining a contour or being enclosed by a contour and such a contour may be made up of a number of contour sections. In the example of a cylinder there are three contour sections. There is in this case a first upper circular contour section ucs, a lower circular contour section (not shown) and a cylindrical contour section ccs in-between and joined to the upper and lower circular contour sections. As stated above, the tool or gripper is able to move and pick any object inside the working volume wv, but unable to pick any objects outside of the working volume wv.

The robots are provided for handling objects on object transporting devices, such as picking objects or placing objects on object transporting devices, where an object transporting device may be a conveyor belt. For this reason objects transported by an object transporting device, such as a conveyor belt, intersect the contour of the working volume. The objects may furthermore intersect the working volume in two different regions of the contour; in an entry region enr and in an exit region exr. Thereby they also intersect at least one of the contour sections and perhaps two or more contour sections.

Figure 4:
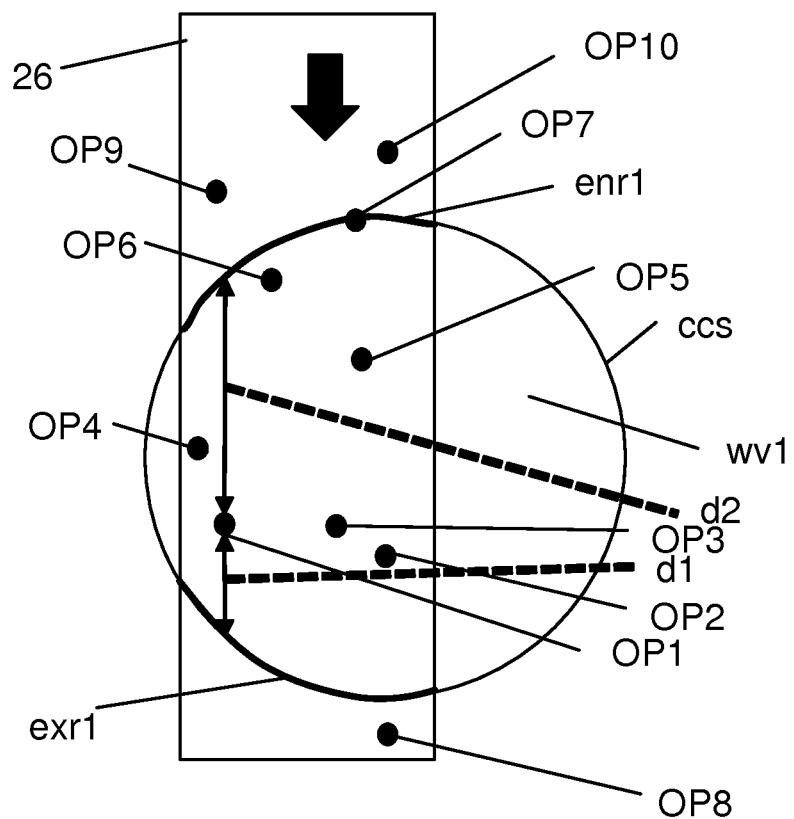

FIG. 4 shows a cross section of a first working volume wv1 provided for picking objects and through this volume a first object transporting device 26 is provided. The first object transporting device 26 thus intersects at least one of the contour sections and in this case intersects the cylinder contour section ccs in an entrance region enr1 where objects on the first object transporting device enter the first working volume wv1 and an exit region exr1 where they exit the first working volume wv1. Each region may be defined by the width of the first object transporting device 26 as well as by the height of the objects being transported. At least one of the regions and perhaps both are furthermore curved. The regions are thus provided in a curved part of the contour. The at least one region may thus have a curved surface, such as a concave surface. It can thereby be seen that at least one region of the contour that is intersected by the first object transporting device is curved and that the objects enter and/or exit the working volume via such a curved region.

The first object transporting device 26 has a path of object transport, i.e. a path along which it transports objects, which object transporting path in this case is along a direction in the plane of the cross-section. The direction of transport may furthermore be perpendicular to the center axis of the cylinder. As can be seen in FIG. 4 both the entry region enr1 and the exit region exr1 are provided in the cylinder contour section ccs. However, it should be realized that it is possible that depending on how the working volume is determined, the entry and exit regions may be provided in different contour sections. Furthermore, at least one of the entry and exit regions are provided in a part of the contour that is curved or has a curvature such that objects having the same positions along the first object transporting direction but separated in a direction perpendicular to the object transporting direction will most probably enter the first working volume wv1 at different instances in time. There is also, depending on the curvature of the entry region, a small chance that they enter the first working volume wv1 at the same time even if they are only separated in a perpendicular direction. As can be seen in FIG. 4 it is possible that both regions are provided in one or more curved parts of the contour, which may be concave parts. The objects transported by the first object transporting device 26 thus enter the first working volume wv1 through the entry region enr1 of the first working volume wv1 and exit the first working volume wv1 via the exit region exr1. Furthermore the shown object transporting path is straight. It should however be realized that it may have any suitable shape. It may for instance be curved, such as being circular.

In FIG. 4 there are shown a number of object positions in the first working volume wv1. The positions are furthermore candidate handling positions, which in the case of picking are estimated picking positions where the objects according to an estimation may be picked. There are first, second, third, fourth, fifth, sixth and seventh object positions OP1, OP2, OP3, OP4, OP5, OP6 and OP7 in the first working volume wv1, where the seventh object position OP7 is halfway in. There is also an eighth object position OP8 that has left the first working volume wv1 as well as ninth and tenth object positions OP9 and OP10 outside of the first working volume wv1. In the figure there are also shown two distances associated with the first object position OP1. There is a first distance d1 from the first object position OP1 to the exit region exr1 along the path of transport as well as a second distance d2 from the first object position OP1 to the entrance region enr1 along the path of transport.

As mentioned earlier, the robot is provided for handling objects, such as picking or placing objects. When the robot is provided for picking objects, these may be placed on a second object transporting device such as a second conveyor belt. According to aspects of the invention a working volume may be determined for each of these two types of handling. It is more particularly possible that a working volume is determined for each object transporting path and thus for each object transporting device used with the robot. A first working volume may thus be determined for picking objects on the first object transporting device and a second working volume may be determined for placing objects on the second object transporting device.

Figure 5:
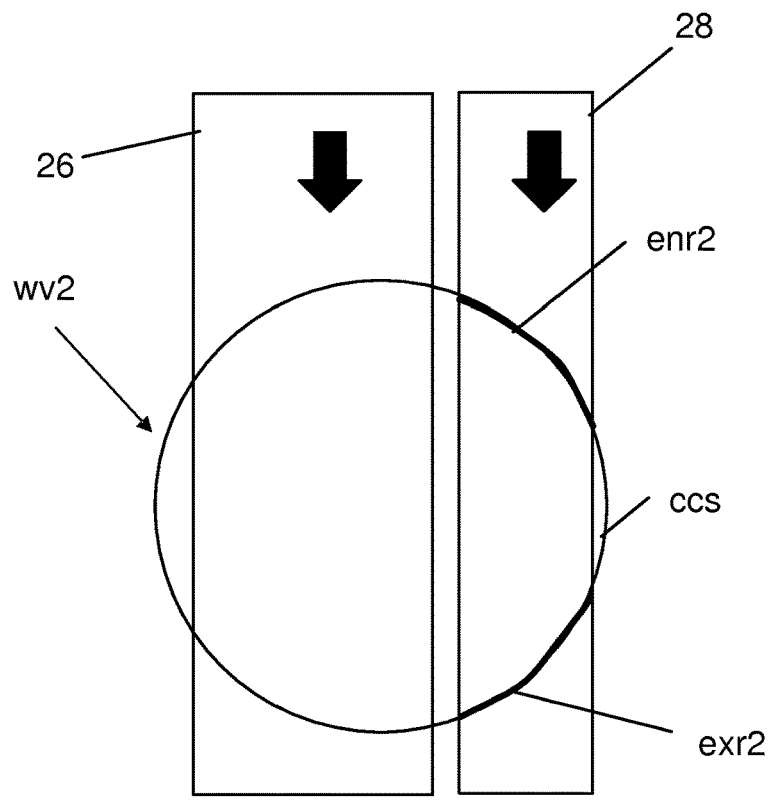

FIG. 5 shows a second working volume wv2 provided for placing objects. The second working volume wv2 has the same type of cross section through it as the first working volume wv1 in FIG. 4. In FIG. 5 there is a second object transporting device 28 together with the first object transporting device 26. The second object transporting device 28 is placed in parallel with the first object transporting device 26. The second object transporting device 28 intersects the second working volume wv2. It more particularly intersects at least one curved region of the contour of the second working volume wv2. In the example of FIG. 5, the second object transporting device 28 has the same direction of transport as the first object transporting device 26. It can thereby be seen that there exists an entry region enr2 and an exit region exr2 associated with the second object transporting device 28. At least one of the entry and exit regions is also in this case provided in a part of the contour that is curved or has a curvature such that objects having the same positions along the object transporting direction but separated in a direction perpendicular to this object transporting direction will most likely exit the second working volume wv2 at different instances in time. However, there is also a small chance that depending on the curvature of the exit region they exit the working volume at the same time even if they are only separated in a perpendicular direction.

In order to simplify matters, no object positions are shown in FIG. 5.

The use of the same object transporting directions may be advantageous in case several robots are to be used to pick objects from the first object transporting device 26 and place them on the second object transporting device 28. However, there do exist situations where different object transporting directions, such as opposite object transporting directions, are advantageous also when several robots are used. Also in case there is only one robot, then it is possible to use another transporting direction for the second object transporting device 28 such as an opposite transporting direction. It should be realized that the transporting paths may have any type of relationship between the transporting directions. The transporting directions may for example be perpendicular to each other.

The robot controller 18 is used to control the activities of the robot. Some of this control may be the control of picking and placing objects. According to aspects of the invention this picking and placing control is performed by an object handling control device. An object handling control device may thus be implemented as a robot controller. However, as will be shown later it is possible that other devices than a robot controller can function as an object handling control device. The combination of robot and object handling control device furthermore forms a robot arrangement.

Figure 6:
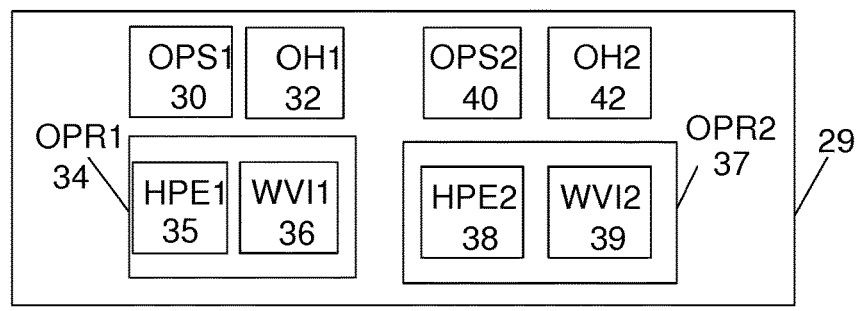
FIG. 6 shows a first way of realizing an object handling control device, FIG. 7 schematically shows a second way of realizing the object handling control device.

FIG. 6 schematically shows one way in which an object handling control device 29 may be implemented. The object handling control device 29 may for this reason comprise a first object position selection module OPS1 30, a first object handling module OH1 32 and a first object processing module OPR1 34. The first object position selection module 30 may be an object selecting module for selecting objects to be picked and the first object handling module 32 may be an object picking control module for controlling the picking of one or more objects. The first object processing module 34 comprises a first handling position estimating block HPE1 35 and a first working volume investigating block WVI1 36. The object handling control device 29 also comprises a second object position selection module OPS2 40, a second object handling module OH2 42 and a second object processing module OPR2 37. The second object position selection module 40 may be a module for selecting object positions in which objects are to be placed, and the second object handling module 42 may be a module for controlling the placing of objects at the selected object positions. The second object processing module 37 comprises a second handling position estimating block HPE2 38 and a second working volume investigating block WVI2 39. The modules with blocks may be realized as one or more separate hardware entities, for instance as separate hardware circuits such as Application Specific Integrated Circuits (ASICs) or Field-Programmable Gate Arrays (FPGAs). They may also be provided as software blocks. It may here be mentioned that it is possible that only one of the object position selection modules, object handling modules and object processing modules is used, either in relation to picking of objects or in relation to placing of objects.

Figure 7:
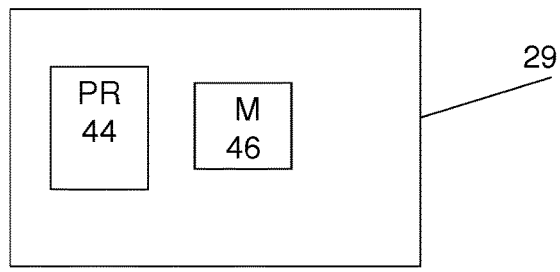

Another way in which the functionality may be realized is schematically shown in FIG. 7. The object handling control device 29 may be realized in the form of a processor PR 44 with associated program memory M 46, in which memory functionality corresponding to the modules and blocks of FIG. 6 is stored.

Figure 8:
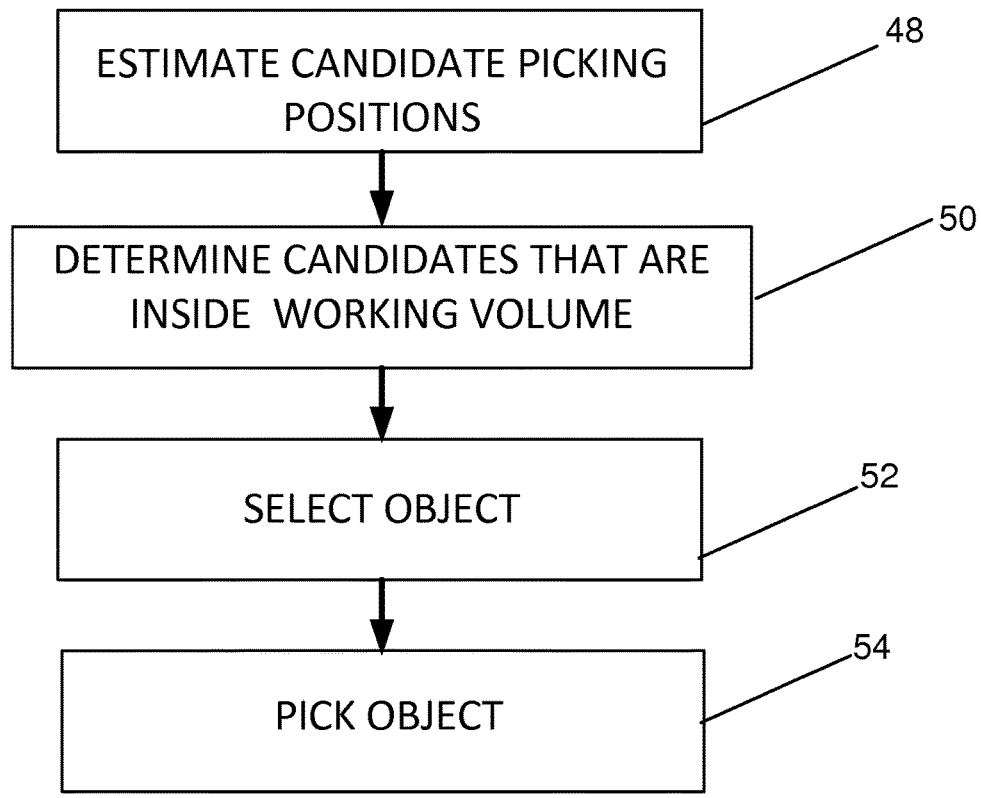
FIG. 8 shows a number of method steps in a method of handling objects in relation to picking being performed by the object handling control device.
Figure 9:
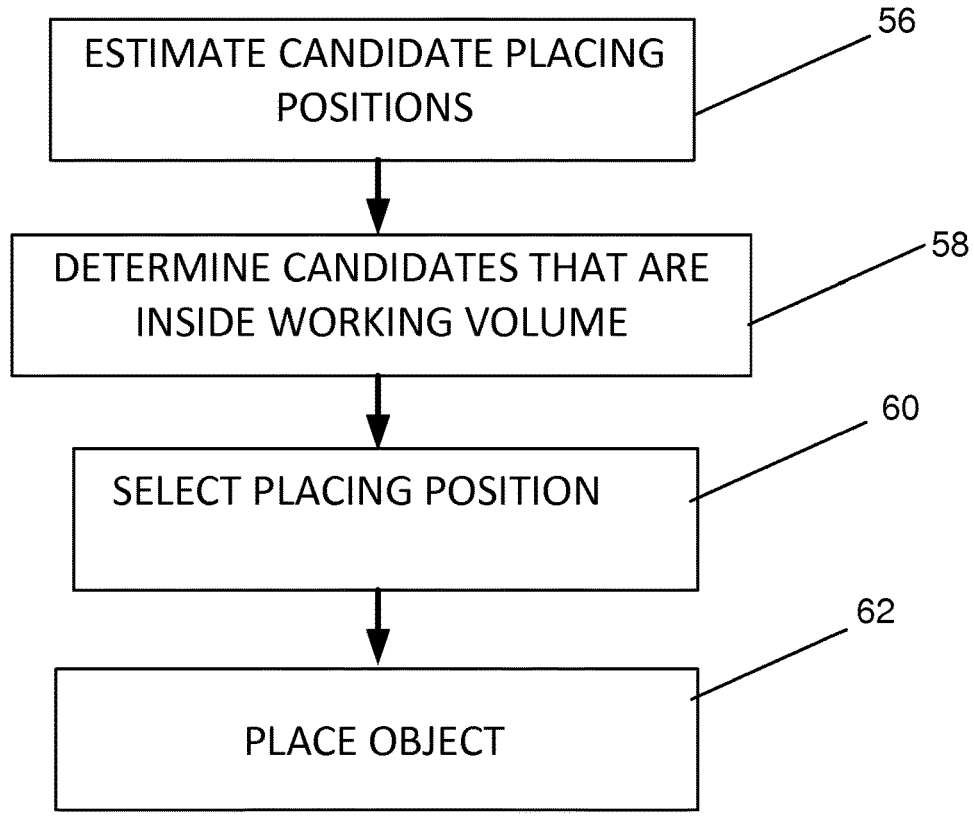
FIG. 9 shows a number of methods steps in a method of handling objects in relation to placing also being performed by the object handling control device, and FIG. 10 schematically shows a computer program product in the form of a CD Rom disc comprising computer program code for the object handling control device.

Now the functioning of the robot arrangement will be described with reference also being made to FIGS. 8 and 9, where FIG. 8 shows a number of method steps performed in a method for handling objects on an object transporting device being carried out in relation to the first object transporting device and FIG. 9 shows a number of method steps in a method for handling objects on an object transporting device being carried out in relation to the second object transporting device. The steps in FIG. 8 are performed by the first object processing module 34, the first object position selection module 30 and the first object handling module 32, while the steps in FIG. 9 are performed by the second object processing module 37, the second object position selection module 40 and the second object handling module 42.

As has been described earlier objects are entering the first working volume wv1 through being transported by the first object transporting device 26. They may then be selected for being picked and perhaps also placed on the second object transporting device 28. It may here also be possible to select where on the second object transporting device 28 a picked object is to be placed, i.e. in which spot on the second object transporting device 28 the selected object is to be placed. An object may for instance be placed in a certain location of a container being transported by the second object transporting device 28.

It is possible that a number of objects pass through the first working volume wv1 and it may therefore be necessary to have a scheme according to which they are being picked. In a similar manner there are a number of object spots on the second object transporting device 28 passing through the second working volume wv2 for which it may be necessary to have a scheme according to which a placing position is selected.

There is according to the invention at least one decision time or decision instant associated with the robot arrangement, which decision instant may be a first decision instant and/or a second decision instant. The first decision instant is a time at which the object handling control device 29 determines which object on the first object transporting device 26 that is to be picked. The second decision instant is a time at which the object handling control device 29 determines in which object spot on the second object transporting device 28 a picked object is to be placed.

The first decision instant of the robot arrangement may be a time at which the robot is in the process of moving a previous object or a time at which the placing of a previous object has been completed. The first decision instant may thus be a time at which the robot performs a number of different activities. What may be of importance though is that the robot or rather the tool or gripper of the robot is located at a certain first decision instant position, such as somewhere above the second object transporting device 28. The first decision instant position may also be somewhere above the first object transporting device 26 or somewhere in-between the two object transporting devices. This position may be of importance because depending on where the tool or gripper is located it will take some time to move to the position of the object that is to be picked. This in turn means that the position of the object has changed between the time that the decision is made and the time that the object is actually picked due to the transporting being carried out by the first object transporting device 26. This also means that there is a risk that the selected object has moved out of the working volume wv1. This is a situation that should be avoided.

The second decision instant of the robot arrangement may in turn be a time at which the placing of an object is determined, where this object may be an object that has been picked or is about to be picked. In this case the second decision instant may be later than the first decision instant, such as after the object has been picked. The second decision instant may furthermore with advantage coincide with the first decision instant. However, it is in some cases possible that the second decision instant precedes the first decision instant.

Also in the case of the second decision instant, it may be important that the robot or rather the tool or gripper of the robot is located at a certain second decision instant position, such as somewhere above the first object transporting device. The second decision instant position may also be somewhere above the second object transporting device or somewhere in-between these two object transporting devices. This second decision instant position may be of importance because depending on where the tool or gripper is located it will take some time to move to the position where an object is to be placed. This in turn means that the spot where the object is to be placed has changed between the time that the decision is made and the time that the object is actually placed due to the transporting being carried out by the second object transporting device 28. This also means that there is a risk that the selected object spot has moved out of the second working volume wv2. Also this is a situation that should be avoided.

As can be seen in FIG. 4 there are a number of object positions that it is possible to select, which object positions are candidate object positions, which in the case of object picking are object positions with objects that are candidates for being picked.

The first object processing module 34 performs object processing in respect of each candidate object position, where the object positions within the first working volume wv1 in FIG. 4 are such candidate object positions. In some variations of the invention, candidate object positions are positions corresponding to spots on an object transporting device that are inside the working volume at the time the selection is made. In other variations the candidate object positions may additionally correspond to spots that are outside of the working volume at this time, but will be in the working volume at a time of handling.

It can be seen that each of the object positions on the first object transporting device 26 has a relationship to the other object positions, where in the case of FIG. 4 an object position is the position of an object on the first object transporting device 26 at a time at which the object is handled. More particularly, each spot that may become a candidate object position is a spot in a coordinate space of the first object transporting device 26, which coordinate space is moved, which movement depends on the path type. A straight path may involve a linear movement of the coordinate system, while a circular path may involve a rotation of the coordinate system.

For each spot with an object on the first object transporting device 26, the first handling position estimating block 35 estimates a corresponding candidate handling position. The first handling position estimating block 35 thus estimates candidate handling positions in the form of picking positions for a number of candidate objects, step 48, which estimating is furthermore performed using a first assumption.

In this first embodiment the first assumption involves the first handling position estimating block 35 determining a first assumed usage time of the robot, where the assumed usage time is the time of movement from a current robot position to the handling position and the time for handling an object at the handling position. As an alternative it should be realized that in some embodiments there is no determination of a usage time. In this case there is instead an assumed travel distance of the first object transporting device during the first usage time.

Furthermore, in this specific example the first assumed usage time being determined by the first handling position estimating block 35 is a picking time, i.e. the time for picking an object. The first handling position estimating block 35 thus determines a first usage time, which first usage time in this case is the movement time from the first decision instant position to a candidate handling (picking) position and a gripping time for gripping the object when at the candidate handling (picking) position, where the first decision instant position is the robot position at the time of the decision. The first usage time is thus the time required for moving the robot to and gripping the candidate object.

The candidate handling positions may then be obtained through estimating the movement of each spot carrying a candidate object along the transporting path of the first object transporting device 26 during the usage time for arriving at the corresponding handling position and handling of an object at this handling position. The determination thus involves an estimation of the movement of and handling of a candidate object in order to obtain the corresponding candidate handling position. When the usage time is determined, this involves estimating the movement during the usage time. As an alternative it is possible that an estimated movement is directly applied and that is not dependent on a determined usage time value. In this case the movement is an assumed travel distance of the first object transporting device during the usage time. The estimated movement may in this case be a worst case estimate, e.g. a longest expected travelling distance of the first object transporting device during the usage time. As an alternative the worst case estimate may be a shortest travelling distance to the working volume. The estimated movement may also be based on previously determined travelling distances. It may additionally be a value that has been tuned to work (without causing reach failures) based on trial and error. As the object position is a position at which an object that is to be picked is provided, the first handling position estimating block 35 estimates a movement of the object for arriving at a picking position. It can also be seen that the estimated object spot movement is an estimate of the movement of the coordinate space of the first object transporting device. In the estimate of the movement it is possible to use predictions of variations in transporting speed. If the transporting speed is known at the decision instant, a prediction of the variation of the transporting speed may be used in obtaining a fine-tuned movement estimation.

The first working volume investigating block 36 additionally determines, for each candidate handling position, whether it lies within the first working volume wv1, step 50. The block thus determines if the candidate objects are within the working volume or not after or at the end of the usage time. This may be done based on determining the movement of the spots on the first object transporting device during the usage time.

There are a number of criterions that may be used to determine candidates within the working volume. As the candidate handling positions correspond to spots on the first object transporting device, the candidate handling positions may comprise positions for which the corresponding spots are inside the working volume at the first decision instant and remain inside the working volume after the first usage time. It is also possible that the candidate handling positions comprise positions for which the corresponding spots are outside of the working volume at the first decision instant, but inside the working volume after the first usage time.

Thereafter the first object position selection module 30 selects one of the candidate object positions, which selection is based on the different determinations made by blocks 35 and 36. The object position selection module 30 thus selects one of the candidate positions at the first decision instant. The selection is at least partially based on the determination about which candidate objects are within the working volume wv1. The position selection module 30 thereby selects an object position among a number of candidate object positions in the working volume based on the processing that was performed in relation to each candidate object position. As there is an object at the selected object position, the selection is in this case also a selection of the object at the candidate object position, step 52. The selection is more particularly made while considering any curvatures of the exit and/or entry regions. In this selection it is possible that the distance d1 between the candidate object position and the curved exit region exr1 is considered. It is more particularly possible that an estimated object position found to be outside of the first working volume is disregarded, i.e. that a candidate being located a distance downstream from the exit region exr1, i.e. a negative distance, is not being picked. Put differently it is possible that an estimated object position is selected which has to be within the first working volume and having a positive distance to the exit region. The selected estimated object position thus has to be inside the first working volume wv1.

In order to allow a selection to be made, the first object position selection module 30 may determine a value for each candidate object position, which value may be a priority value. Such a value may among other things be linked to the distance between the candidate object position and the exit region.

It is for instance possible that an object position having the shortest distance to the exit region is chosen. It is thus possible that the selected object position is the handling (picking) position that is closest to the exit region. This can readily be seen in FIG. 4, where the first object position OP1 is selected. The first object position OP1 has clearly a shorter distance d2 from the entry region enr than the second object position OP2 and is also clearly behind the second object position in the direction of transport. However, since the exit region exr is curved, the first object position has a shorter distance to the exit region enr in the direction of transport than all other object positions within the working volume and therefore it may be selected before these. An object position having a shorter positive distance to the concave exit region may thus have a higher priority than an object position having a longer positive distance.

It is also possible that the selection is based on the relationship of a candidate object position to the entry region. It is possible that the distance d2 to the concave entry region enr is considered. It is for instance possible that an object that is deemed not being able to enter the working volume after the consideration of the first usage time is disregarded. It is thereby possible that the selection involves selection of an object deemed to have entered the working volume before the estimated point in time of the pick. It is also possible that object positions having a longer distance to the entry region enr are given higher priority than objects having shorter distances.

It is also possible that the usage times of previous picks are considered as well as an estimate of the transporting speed of the first object transporting device during the movement from the decision position to the picking position.

At the same time the usage time of the pick may be measured by the robot controller 18 in order to obtain a usage time measurement for use in following candidate handling position estimations. In this way the usage time of the current pick may also be used in the estimation of the usage time of future picks. The measurement of the usage time may be the base of a second assumption, which may be used in later picks for estimating candidate handling positions. It is thus possible to measure the usage time and estimate candidate handling positions for at least one object based on the second assumption, where the second assumption is at least partially based on at least one usage time measurement. Thereby the object handling control device is able to learn from successful picks (rather than unsuccessful picks) as to what margins are needed to perform successful picking of objects from the first object transporting device. This learning may furthermore be in-built/automatic and require no tuning. The expected usage time may furthermore be a general value or grouped for different scenarios.

When an assumed travel distance of the first object transporting device during the usage time is used (without estimating a usage time value), it is similarly possible that the movements of previous picks are considered in an analogous way.

Once an object has been selected, the first object handling module 32 then handles the object at an actual handling position corresponding to the selected candidate handling position, where the handling furthermore takes place after the usage time. The first object handling module 32 thus controls the robot to pick the selected object, step 54.

As the candidate handling positions are estimated positions, a selected candidate handling position may differ somewhat from the corresponding actual handling position. This difference may decrease with time if the measured usage time is used in the estimations.

After the pick has been made, the object may be placed at a placing spot.

In case the placing is to be made on the second object transporting device 28, this placing may be carried out using essentially the same type of scheme to be described shortly.

If the same type of scheme is to be used, the second object processing module 37 performs object processing in respect of each candidate object position, where there are a number of candidate object positions in the second working volume wv2 where a picked object may be placed.

Just as in the case of the first object transporting device 26, each of the object spots on the second object transporting device 28 has a relationship to the other object spots, where also each candidate object position will correspond to a spot in a coordinate space of the second object transporting device 28 after a usage time.

For each spot on the second object transporting device 28 that may become a candidate object position, the second handling position estimating block 38 may determine a second usage time of the robot, which also in this case is the time of movement from a second decision instant position to a second handling position, and the time of handling an object at the second handling position.

Furthermore, in this specific example the second usage time being determined by the second handling position estimating block 38 is a placing time, which second usage time is the movement time from the second decision instant position to a placing position, and a releasing time for releasing the object when at the placing position. In this example the decision is taken after the pick is made. The usage time is thus the time required for moving the robot to and releasing the picked object at the candidate handling position.

Moreover, the second handling position estimating block 38 additionally estimates the movement of each candidate object spot along the transporting direction path of the second object transporting device during the second usage time, which may be done in the same way as for the picking, where the difference is that the act of gripping an object is replaced by the act of releasing an object. As the object position is a position at which an object is to be placed, the second handling position estimating block 38 estimates the candidate placing positions, step 56. It can also be seen that the estimated object spot movement is an estimate of the movement of the coordinate space of the second object transporting device 28. It is also here possible to use predictions of variations in transporting speed. In case an assumed travel distance of the second object transporting device during the second usage time is employed, it is possible that the second movement estimate is a worst case estimate, e.g. a longest expected travelling distance of the second object transporting device while moving to and handling the object, based on previously determined travelling distances and/or a value that has been tuned to work.

The second working volume investigating block 39 then determines, for each candidate handling position, whether it lies within the second working volume wv2, step 58. The block thus determines if the candidate objects are within the working volume or not after or at the end of the usage time.

Thereafter the second object position selection module 40 selects one of the candidate object positions where the object is to be placed, step 60, which selection is based on the different determinations made by the second handling position estimating block 38 and the second working volume investigating block 39 about the candidate object positions. The object position selection module 40 thus selects an object position among a number of candidate object positions in the second working volume wv2 based on the processing that was performed in relation to each candidate object position. The selection is more particularly made while considering any curvatures of the exit and/or entry regions. Also in this selection it is possible that the distance between the candidate object position and the curved exit region exr2 is considered. It is more particularly possible that an object position found to be outside of the working volume is disregarded.

The same type of considerations described in relation to the selection of the first object position selecting module may in this case also be employed by the second object position selection module.

Once an object position has been selected for the object, the second object handling module 42 controls the robot to place the object at the selected placing position, step 62.

Generally the operation of pick and place may be the following:
 1) Determine an object to pick.
 2) Pick the object.
 3) While the robot is moving towards the pick position, the place position is determined.
 4) Place the object at the place position as soon as it has been picked up.

In the example given above the scheme was used for both picking and placing objects. It should be realized that the use of the scheme may be varied.

It is for instance possible that there is no second object transporting device, but only a first object transporting device from which objects are picked and placed in a stationary placing area. They may then also be placed in a pre-defined pattern in this stationary area. In this case the scheme would only be used for picking. Alternatively it is possible that there is no first object transporting device but a stationary picking area from which object are picked and placed on the second object transporting device. In this case the scheme would only be used for placing.

In the example given above a robot was described as picking and placing objects one at a time. Also this may be varied. A robot may be able to pick up multiple objects one-by-one. In this case there will be a decision instant for each individual pick. It is then possible that these objects are placed one at a time or simultaneously, where each such placing would then have its own separate decision instant.

When picking and placing are both performed using the scheme, then the first decision instant of the pick and the second decision instant of the place may coincide or the second decision instant of the place may follow after the first decision instant of the pick. The second decision instant may also occur just before the first decision instant.

When the second decision instant occurs before the first decision instant, a place position is thus selected first and a matching pick position is selected just afterwards. After both selections have been made, the pick and the place is performed. The second usage time for the place position will in this scenario include also the movement to the pick position, the gripping time, the movement to the place position and the object release time.

From FIGS. 4 and 5 it is possible to get the impression that there is no real working volume but a working area in which the handling takes place. One may thus get the impression that there is no variation in the vertical direction.

However, it is possible that objects being picked have different sizes and above all different heights. This means that the picking position would have a vertical component depending on object height.

Furthermore, it is also possible that the objects are handled in different zones. The working volume may be divided into different zones, where each zone in a working volume may have usage times within a common usage time range. There may as an example be different zones in parallel with each other stretching through the working volume along the transporting path of an object transporting device. The usage times of previously selected object positions in a zone may then be used for determining current usage times of the current candidate object locations in the same zone. In case movement estimates are used instead, these may be used in a similar way.

Furthermore, it is possible that usage times are measured during a usage time learning period, during which it is possible that no candidate handling positions are being estimated. It is also possible that candidate handling positions are being estimated during this learning period. It is then possible that the usage times measured during the learning period are later used (after the expiry of the learning period) in estimating candidate handling positions. It is also possible that usage time measurements are not being made after the expiry of the learning period. In this case it is possible that candidate handling position estimations are based only on usage time measurements made during the learning period. It can thereby be seen that the measuring of the usage time does not necessarily have to be made simultaneously with or at the same time as the estimating of candidate handling positions based on the second assumption.

It is also possible with several robots at different locations along the first and second object transporting devices, where one downstream robot may take care of objects that an upstream robot is unable to handle.

Figure 10:
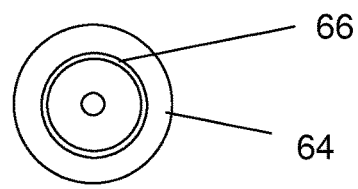

As was mentioned above, the object handling control device may be provided in the form of one or more processors together with computer program memory including computer program code for performing its functions. This computer program code may also be provided on one or more data carriers which perform the functionality of the object handling control device when the program code thereon is being loaded in a computer forming object handling control device. One such data carrier 64 with computer program code 66, in the form of a CD ROM disc, is schematically shown in FIG. 10. Such computer program may as an alternative be provided on a server and downloaded therefrom into the computer forming the parameter determining device.

There are a number of variations that may be made apart from those already described. The object handling control device may for instance be provided separately from a robot controller. In this case the object handling control device would make all determinations of objects to pick and place. It would then inform the robot controller about the positions that the corresponding robot would have to assume for picking and placing the objects.

The invention has the advantage of allowing the amount of picking or placing failures to be reduced. However, if a failure does occur, it is possible to decrease the working volume, especially the downstream working volume.

The working volume was above described in the form of a cylinder. It should be realized that this is only one example of a simplified working volume. A wide variety of other types of working volumes are possible. One other possible type is for instance a sphere. However, also more complex working volumes are envisaged. The only limitation is the operational range of the robot used.

Therefore, while the invention has been described in connection with what is presently considered to be most practical and preferred embodiments, it is to be understood that the invention is not to be limited to the disclosed embodiments, but on the contrary, is intended to cover various modifications and equivalent arrangements. Therefore the present invention is only to be limited by the following claims.

The invention claimed is:

1. A method for handling objects (O1) on an object transporting device using an industrial robot, the method comprising the steps of:
    estimating a candidate handling position (OP1, OP2, OP3, OP4, OP5, OP6, OP7) for at least one candidate object based on a first assumption;
    determining for each candidate handling position whether it lies within a working volume (wv1; wv2) of the robot;
    selecting one of the candidate handling positions (OP1, OP2, OP3, OP4, OP5, OP6, OP7) at a first decision instant, the selection being at least partially based on the result of the determining;
    handling an object at an actual handling position corresponding to the selected candidate handling position, the handling being performed after a usage time of the robot, the usage time including the time for moving the robot from the robot position at the first decision instant to the actual handling position, and the time for handling the object;
    measuring the usage time in order to obtain a usage time measurement for use in following candidate handling position estimations; and estimating candidate handling positions (OP1, OP2, OP3, OP4, OP5, OP6, OP7) for at least one other candidate object based on a second assumption, the second assumption being based on at least one usage time measurement.

2. The method according to claim 1, wherein the working volume (wv1; wv2) is determined by the robot positions that the robot is able to occupy, the working volume thereby defining a contour, where at least one region of the contour that intersects with the objects is curved.

3. The method according to claim 2, wherein the first assumption includes at least one of the following: an assumed travel distance of the object transporting device during the usage time, and an assumed usage time.

4. The method according to claim 2, wherein the candidate handling positions correspond to spots on the object transporting device.

5. The method according to claim 1, wherein the first assumption includes at least one of the following: an assumed travel distance of the object transporting device during the usage time, and an assumed usage time.

6. The method according to claim 5, wherein the working volume is divided into handling zones and the usage time of the selected candidate handling position is related to one of the handling zones and used in following candidate handling position estimations made in respect of the same handling zone.

7. The method according to claim 1, wherein the candidate handling positions correspond to spots on the object transporting device.

8. The method according to claim 7, wherein the candidate handling positions include positions for which the corresponding spots are inside the working volume (wv1; wv2) at the first decision instant.

9. The method according to claim 8, wherein the candidate handling positions include positions for which the corresponding spots are outside of the working volume (wv1; wv2) at the first decision instant, but inside the working volume after the usage time.

10. The method according to claim 7, wherein the candidate handling positions include positions for which the corresponding spots are outside of the working volume (wv1; wv2) at the first decision instant, but inside the working volume after the usage time.

11. The method according to claim 7, wherein the spots on the object transporting device exit the working volume via an exit region (exr1; exr2) of the working volume (wv1; wv2) and the selected candidate handling position is the candidate handling position that is closest to the exit region.

12. A robot arrangement for handling objects (O1) on an object transporting device and including an industrial robot and an object handling control device,
the object handling control device being configured to:
estimate a candidate handling position (OP1, OP2, OP3, OP4, OP5, OP6, OP7) for at least one candidate object based on a first assumption;
determine for each candidate handling position whether it lies within a working volume (wv1; wv2) of the robot;
select one of the candidate handling positions (OP1, OP2, OP3, OP4, OP5, OP6, OP7) at a first decision instant, the selection being at least partially based on the result of the determining;
handle an object at an actual handling position corresponding to the selected candidate handling position, the handling being performed after a usage time of the robot, the usage time including the time for moving the robot from the robot position at the first decision instant to the actual handling position, and the time for handling the object
measure the usage time in order to obtain a usage time measurement for use in following candidate handling position estimations; and
estimate candidate handling positions (OP1, OP2, OP3, OP4, OP5, OP6, OP7) for at least one other candidate object based on a second assumption, the second assumption being based on at least one usage time measurement.

13. The robot arrangement according to claim 12, wherein the working volume (wv1; wv2) is determined by the robot positions that the robot is able to occupy, the working volume thereby defining a contour, where at least one region of the contour that intersects with the objects is curved.

14. The robot arrangement according to claim 12, wherein the first assumption includes at least one of the following: an assumed travel distance of the object transporting device during the usage time, and an assumed usage time.

15. The robot arrangement according to claim 14, wherein the working volume is divided into handling zones and the usage time of the selected candidate handling position is related to one of the handling zones and used in following candidate handling position estimations made in respect of the same handling zone.

16. The robot arrangement according to claim 12, wherein the candidate handling positions correspond to spots on the object transporting device after the usage time, and the candidate handling positions include positions for which the corresponding spots are inside the working volume (wv1; wv2) at the first decision instant.

* * * * *